Sept. 23, 1952  H. E. PLOUGH  2,611,374
PIPE
Filed June 22, 1950

Harold E. Plough
INVENTOR.

BY Clarence A. O'Brien
and Harvey B. Jacobson
Attorneys

Patented Sept. 23, 1952

2,611,374

UNITED STATES PATENT OFFICE 2,611,374

PIPE

Harold E. Plough, Laporte, Minn., assignor of one-half to Harold R. Mitchell, Bemidji, Minn.

Application June 22, 1950, Serial No. 169,614

4 Claims. (Cl. 131—223)

This invention relates to new and useful improvements in pipes and the primary object of the present invention is to provide a pipe so constructed as to permit the mouthpiece and bowl thereof to be quickly and readily cleaned in a convenient manner.

Another important object of the present invention is to provide a pipe having a shank, a mouthpiece including a tubular extension fitted in said shank and having means for selectively opening and closing the forward end of the shank to permit communication of the interior of the bowl with the mouthpiece or the atmosphere through the open end of the shank as the mouthpiece is rotated.

A further object of the present invention is to provide a pipe that is extremely simple and practical in construction thereby permitting the same to be produced and available to the purchasing public at a reasonable cost.

A still further aim of the present invention is to provide a pipe that is strong and reliable in use, small and compact in structure, neat and attractive in appearance, inexpensive to manufacture, and otherwise well adapted for the purposes for which the same is intended.

Other objects and advantages reside in the details of construction and operation as more fully hereinafter described and claimed, references being had to the accompanying drawings forming part hereof, wherein like numerals refer to like parts through, and in which:

Figure 1:
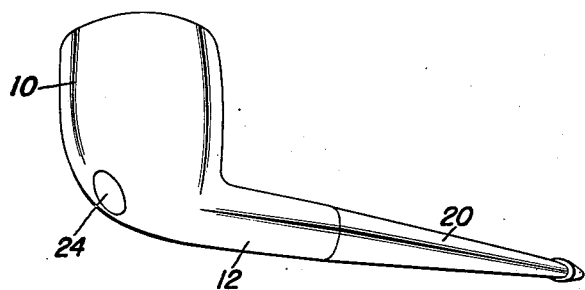
Figure 1 is a perspective view of the present pipe.
Figure 2:
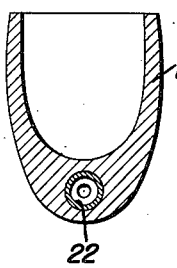
Figure 2 is a vertical sectional view taken substantially on the plane of section line 2—2 of Figure 3.

Referring now to the drawings in detail, wherein for the purpose of illustration, there is disclosed a preferred embodiment of the present invention, the numeral 10 represents a pipe bowl having a shank 12 integrally formed therewith. The forward and outer surface of the bowl 10, at the forward open end of the shank 12, or about the edges defining the opening at the forward end of the shank 12, is convex as indicated at 14.

A downwardly and forwardly inclined passage 16 is provided in the bottom wall of the bowl 10 and forms a communication between the interior of the bowl and the forward end of the passage.

A mouthpiece 20 is associated with the shank 12 and includes a tubular extension 22 that is attached thereto, is fitted in the shank 12 and which is manually rotatable in the shank 12. The forward end of the extension 22 is closed by a plate or end wall 24 that is inclined relative to the axis of the extension 22. The plate 24 includes a forward or outer surface that is flush with the surface 14 to close the forward end of shank 12 when the extension 22 is rotated by rotating the mouthpiece 20, to register an opening or slot 26 in the extension 22 and adjacent the plate 24, with the passage 16, as shown in Figure 3, whereby smoke may be drawn from the bowl into and through the mouthpiece.

Figure 3:
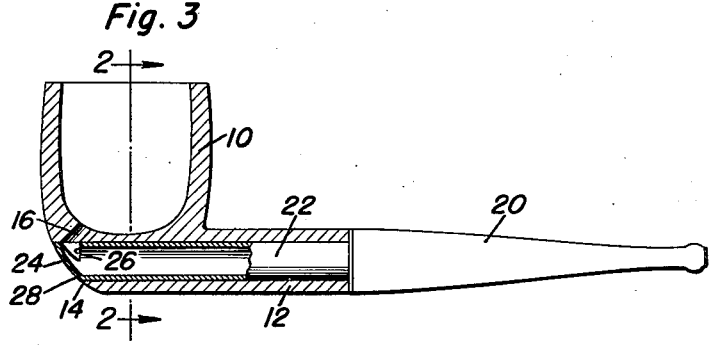
Figure 3 is a sectional view showing the mouthpiece in its normal position to permit smoke to pass from the pipe bowl into the mouthpiece; and, Figure 4 is a view similar to Figure 3 but showing the mouthpiece rotated to permit cleaning out of the mouthpiece and bowl.
Figure 4:
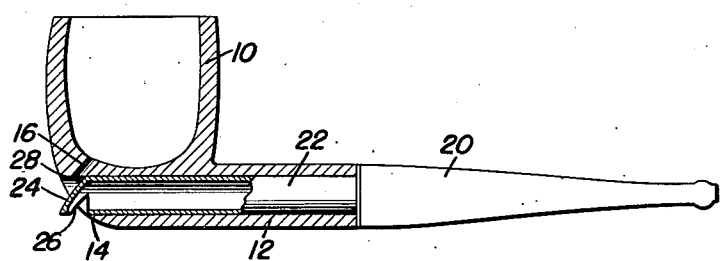

In practical use of the pipe, the extension 22, plate 24 and opening 26 are positioned as shown in Figure 3, so that the forward end of the shank 12 will be closed and smoke may be drawn into the mouthpiece. However, the inner portion 28 of the plate 24 is so located that as the extension 22 is rotated 180° from its position shown in Figure 3, the portion 28 will be positioned rearwardly of the lower end of the passage 16 to permit a cleaner to be inserted through the forward open end of the shank 12 and into the passage 16 and the interior of the bowl 10. Also, the opening 26 will be exposed to the atmosphere, as shown in Figure 4, to permit blowing out or cleaning of the mouthpiece 20 and extension 22.

The mouthpiece may be permanently attached to or detachably secured to the extension 22.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and the scope of the appended claims.

Having described the invention, what is claimed as new is:

1. A pipe comprising a bowl, a shank integrally formed with the bowl and including forward and rear open ends, said bowl having a downwardly and forwardly inclined passage in its lower wall entering the forward end of said shank at the outer periphery of said bowl, a mouthpiece including a tubular extension received in said shank, said extension including a forward end underlying said passage, a closure plate at the forward end of said extension in inclined relation to the longitudinal axis of said extension, said extension having an opening therein adjacent said plate adapted to register with said passage when the plate is moved by rotating the extension to a position for closing the open forward end of said shank, said bowl having an outer surface at the forward end of said shank flush with said plate when said opening is registered with said passage, said passage being exposed to the atmosphere through the forward end of said shank when the extension is rotated to incline the plate in the same direction as the passage.

2. A pipe comprising a bowl, a shank integrally formed with the bowl and including forward and rear open ends, the forward end of said shank being located at the outer periphery of said bowl, said bowl having a downwardly and forwardly inclined passage in its lower wall including a lower end communicating with the forward end of said shank at the outer periphery of said bowl, a mouthpiece including a tubular extension received in said shank for rotation, a closure plate at the forward end of said extension inclined relative to the longitudinal axis of said extension and adapted to block the forward end of said shank, said plate including a forward portion disposed forwardly of the lower end of said passage and a rear portion disposed behind the lower end of said passage, said extension having an aperture therein adjacent and behind the forward portion of said plate in registry with the lower end of said passage when the forward portion of said plate is disposed above the rear portion of said plate and when the plate is positioned to close the forward end of said shank, said passage being exposed to the atmosphere through the forward end of said shank when the extension is rotated in the shank to position the rear portion of the plate above the forward portion of the plate.

3. A pipe comprising a bowl having a forward convex outer surface, a shank integrally formed with said bowl and having forward and rear open ends, the forward open end of said shank being located at the lower forward convex outer surface of said bowl, a downwardly and forwardly inclined passage in the bottom wall of the bowl including a forward end communicating with the forward end portion of said shank adjacent the forward convex outer surface of said bowl, a mouthpiece including a tubular extension rotatably positioned in the shank, and an inclined convex closure plate at the forward end of said extension, said extension having an aperture adjacent said plate adapted to register with said forward end of said passage, said plate being inclined relative to said passage and flush with said forward convex outer surface when the aperture in said extension registers with the forward end of said passage, and said passage communicating with the atmosphere adjacent the forward convex outer surface when the extension is rotated to incline in the same direction as the passage.

4. A pipe comprising a bowl having a forward convex outer surface, a shank integrally formed with said bowl and having forward and rear open ends, the forward open end of said shank being located at the forward convex outer surface of said bowl, the bottom wall of said bowl having a passage therein including a lower end communicating with the forward end portion of said shank, a mouthpiece including a tubular extension rotatably positioned in the shank, and an inclined closure plate at the forward end of said extension including a forward portion disposed forwardly of the lower end of said passage and a rear portion disposed behind the lower end of said passage, said extension having an aperture adjacent the forward portion of said plate adapted to register with the lower end of said passage when the extension is rotated to position the forward portion of said plate above the rear portion of said plate, whereby the interior of the bowl will be in communication with the extension through the passage and aperture, said passage being in communication with the forward end portion of said shank in front of the plate when the extension is rotated to position the rear portion of said plate above the forward portion of said plate.

HAROLD E. PLOUGH.

REFERENCES CITED

The following references are of record in the file of this patent:

UNITED STATES PATENTS

| Number | Name | Date |
| --- | --- | --- |
| 12,132 | Willis | July 21, 1903 |
| 1,511,603 | Gaisman | Oct. 14, 1924 |
| 1,924,539 | Brown | Aug. 29, 1933 |
| 2,395,596 | Vonnegut | Feb. 26, 1946 |

FOREIGN PATENTS

| Number | Country | Date |
| --- | --- | --- |
| 236,119 | Great Britain | July 2, 1925 |
| 121,871 | Switzerland | Aug. 1, 1927 |